United States Patent [19]

Souza et al.

[11] Patent Number: 5,606,823
[45] Date of Patent: Mar. 4, 1997

[54] COVER CROP SYSTEM

[75] Inventors: Edward J. Souza; Charlotte E. Eberlein, both of Ameican Falls, Id.

[73] Assignee: Idaho Research Foundation, Moscow, Id.

[21] Appl. No.: 243,847

[22] Filed: May 16, 1994

[51] Int. Cl.$^6$ .............. A01G 1/00; A01G 13/00; A01H 1/00; A01H 4/00
[52] U.S. Cl. ............ 47/58; 47/DIG. 1; 800/200; 800/250; 800/DIG. 58
[58] Field of Search .............. 47/58, 58.01, 58.03, 47/DIG. 1; 800/200, 250, DIG. 58

[56] References Cited

U.S. PATENT DOCUMENTS

| | | | |
|---|---|---|---|
| 4,680,888 | 7/1987 | Tsunewaki et al. | 47/58 |
| 5,278,057 | 1/1994 | Jorgensen | 435/172.3 |

FOREIGN PATENT DOCUMENTS

| | | |
|---|---|---|
| 0132521A1 | 2/1985 | European Pat. Off. . |
| 0198288A2 | 10/1986 | European Pat. Off. . |

OTHER PUBLICATIONS

Hermsen, J. G.Th. (1963a), "Sources and Distribution of the Complementary Genes for Hybrid Necrosis in Wheat," *Euphytica* 12:147–160.

Zeven, A. C. (1965), "First Supplementary List of Genotypes of Hybrid Necrosis of Wheat Varieties," *Euphytica* 14:239–243.

Eberlein and Souza, cover page of grant application to the USDA entitled "Development of Winter Wheat Cover for Weed Control in Potatoes," Jan. 4, 1991.

Miura et al., "The Location of Major Genes and Associated Quantitative Trait Loci on Chromosome Arm 5BL of Wheat," *Theor Appl Genet* 85:197–204 (1992).

Hermsen, J. G.TH. 1963b. Hybrid necrosis as a problem for the wheat breeder. Euphytica. 12(1):1–17 Apr. 1963.

*Primary Examiner*—David T. Fox
*Assistant Examiner*—Thomas Haas
*Attorney, Agent, or Firm*—Klarquist, Sparkman, Campbell, Leigh & Whinston

[57] ABSTRACT

The present invention provides cover crop systems which employ hybrid lethal plant varieties. Hybrid lethal cover crops such as hybrid lethal wheat varieties are useful, for example, in reducing soil erosion and inhibiting weed growth during the winter season prior to planting the primary crop (e.g., potatoes).

20 Claims, 2 Drawing Sheets

COVER CROP SYSTEM

ACKNOWLEDGEMENT OF GOVERNMENT SUPPORT

This invention was made with government support of proposal number 91-15, Western Regional Integrated Pest Management Special Grants, awarded by the U.S. Department of Agriculture Cooperative Research Service. The government has certain rights in this invention.

TECHNICAL FIELD

This invention is related to the field of weed and erosion control, in particular to the use of hybrid lethal plant varieties as cover crops.

BACKGROUND ART

Potatoes (*Solanum tuberosum*) are an important crop plant, particularly in the Pacific Northwest (Washington, Oregon, and Idaho), where they are grown on over 500,000 acres. In addition, Idaho has a high value seed potato industry.

Weeds are the most important biotic stress factor limiting potato yield (Rioux et al. (1979) Can. J. Plant Sci. 59:367–374). Weeds compete with potatoes for light, water, and nutrients, and interfere with harvest operations. For example, one redroot pigweed (*Amaranthus retroflexus*) per meter of row reduces marketable potato yield by 28 percent, and one barnyard grass plant per meter of row reduces marketable yield by an average of 20 percent (Vangessel and Renner (1990) Weed Sci. 38:338–343). In addition, weeds harbor pests that attack potatoes, including insects, nematodes, and common potato diseases such as early blight, late blight, Verticillium wilt, and potato viruses X and Y (Ogg and Rogers (1989) Rev. Weed Sci. 4:25–58).

Mechanical removal by surface tillage and chemical removal by application of herbicides are the conventional weed control options in potatoes (Dallyn (1973) Am. Potato J. 48:116–128). Strict tuber quality requirements limit the use of mechanical cultivation for weed control. Multiple cultivations compact soil, which reduces aeration and potato growth and produce clods that bruise potatoes at harvest (Callihan (1989) Univ. of Idaho Bulletin No. 695). Cultivation may also directly damage foliage and roots, reducing yield and decreasing tuber quality. Growers using cultivation alone for weed control have been shown to have a 12 to 20 percent yield loss compared to growers using herbicides (Callihan (1989) Univ. of Idaho Bulletin No. 695). In seed growing areas, cultivation after potato emergence may spread disease.

Although potatoes are a major crop in the Pacific Northwest, they are viewed as less significant from a nationwide perspective by agricultural chemical companies. Consequently, few herbicides are registered for use on potatoes and very few experimental compounds are being evaluated. Only six herbicides, trifluralin, pendimenthalin, EPTC, metolachlor, metribuzin, and sethoxydim are currently registered for use on potatoes in Idaho and Washington. Of these, metribuzin is used on the majority of acres treated because the other available compounds are primarily (or solely in the case of sethoxydim) grass-control herbicides. In contrast, metribuzin controls a broad spectrum of broadleaf and grass weeds that are problems in potato production. Metribuzin may be used before or after emergence of the potato plants and is the only herbicide available for postemergence control of broadleaf weeds in potatoes.

Heavy reliance on metribuzin for weed control in potatoes has led to a shift to weed species that are metribuzin-tolerant, such as hairy nightshade (*Solanum sarrachoides*). Weed populations resistant to triazine herbicides have developed, such as the triazine resistant Powell amaranth population recently discovered in south central Idaho (Eberlein et al. (1992) Weed Sci. 40:507–512). Metribuzin suffers from additional drawbacks. It is a moderately residual herbicide that may persist to injure cereal crops grown in rotation with potatoes. Metribuzin is also readily leached in the low organic matter sandy soils typical of Washington's potato producing areas, and moderately leached in the low organic matter, silt loam soils typical of Idaho's major potato producing areas. In Herbicide Handbook of the Weed Science Society of America, 6th ed., pp. 183–185). Groundwater contamination with metribuzin has also been detected in the irrigated sands used for potato production in Wisconsin (Binning, 1990) and Minnesota (Wyse, D. L., Univ. of Minnesota, St. Paul, Minn., personal communication).

These environmental drawbacks further detract from the use of metribuzin to control weeds. Moreover, an exclusive reliance on chemical herbicides may be restricted in the near future by increasingly stringent regulatory controls. Furthermore, use of chemical herbicides for weed control prevents the potato crop from being sold in the increasingly important "organic produce" consumer market.

There is therefore a clear need for alternative practices for weed control in potato cultivation. Moreover, this need extends to almost all crops grown in the United States today. The search for new weed control technologies has in part focussed on biological control mechanisms. One such option is the use of competitive cover crops.

A cover crop is a crop that is planted either before or at the same time as an annual crop that is to be harvested (herein referred to as the "production crop"). A cover crop can also be used with perennial production crops; again, the cover crop is planted annually. A cover crop can reduce soil erosion that typically occurs in unplanted fields and can also reduce the growth of weeds in the field. Cover crops have been successfully used for weed control in several vegetables in Michigan (Putnam et al. (1983) J. Chem. Ecology 9:1001–1010) and in corn (*Zea mays*) and soybeans (*Glycine max*) in Minnesota (Warnes et al. (1989) Effect of precipitation and management on weed control and crop yields with a winter rye cover crop system, Agronomy Abstracts, p. 296). In Michigan, fall-planted wheat (*Triticum aestivum*) or rye (*Secale cereal*) killed with an herbicide the following spring reduced weed biomass 84 percent and 56 percent, respectively. In Minnesota, fall-planted rye killed chemically the following spring gave about 30 days control of small-seeded weeds such as kochia, redroot pigweed, common lambsquarters, and green foxtail.

To prevent competition between the cover crop and the production crop, the cover crop needs to be killed or removed from the field prior to the growth of the production crop. Two approaches to this have been used to date; mechanical removal of the cover crop with farm implements and chemical killing of the cover crop using herbicides. Both of these approaches have drawbacks: mechanical removal requires additional ploughing of the fields and herbicide application re-introduces chemicals that the cover crop approach was intended to avoid. Removal of the cover crop with herbicides may also mean that the production crop cannot be sold as an organic product. Because of these drawbacks, cover crops are used on only a limited scale at present.

U.S. Pat. No. 5,278,057 (Jorgensen, 1994) discusses cover crops into which a dominant conditional lethal marker has been introduced by genetic engineering techniques. Such a cover crop can be killed to free a field for replanting by application of a chemical compound which is converted by the marker gene into a toxic metabolite. Here again, the removal of the cover crop requires additional steps and the application of chemicals to the field.

It is an object of the present invention to provide a new means of reducing soil erosion and weed growth in crops, including potatoes. It is a further object of the invention to provide a means for reducing soil erosion and weed growth without the use of chemical herbicides.

DISCLOSURE OF THE INVENTION

Definitions

Figure 1:
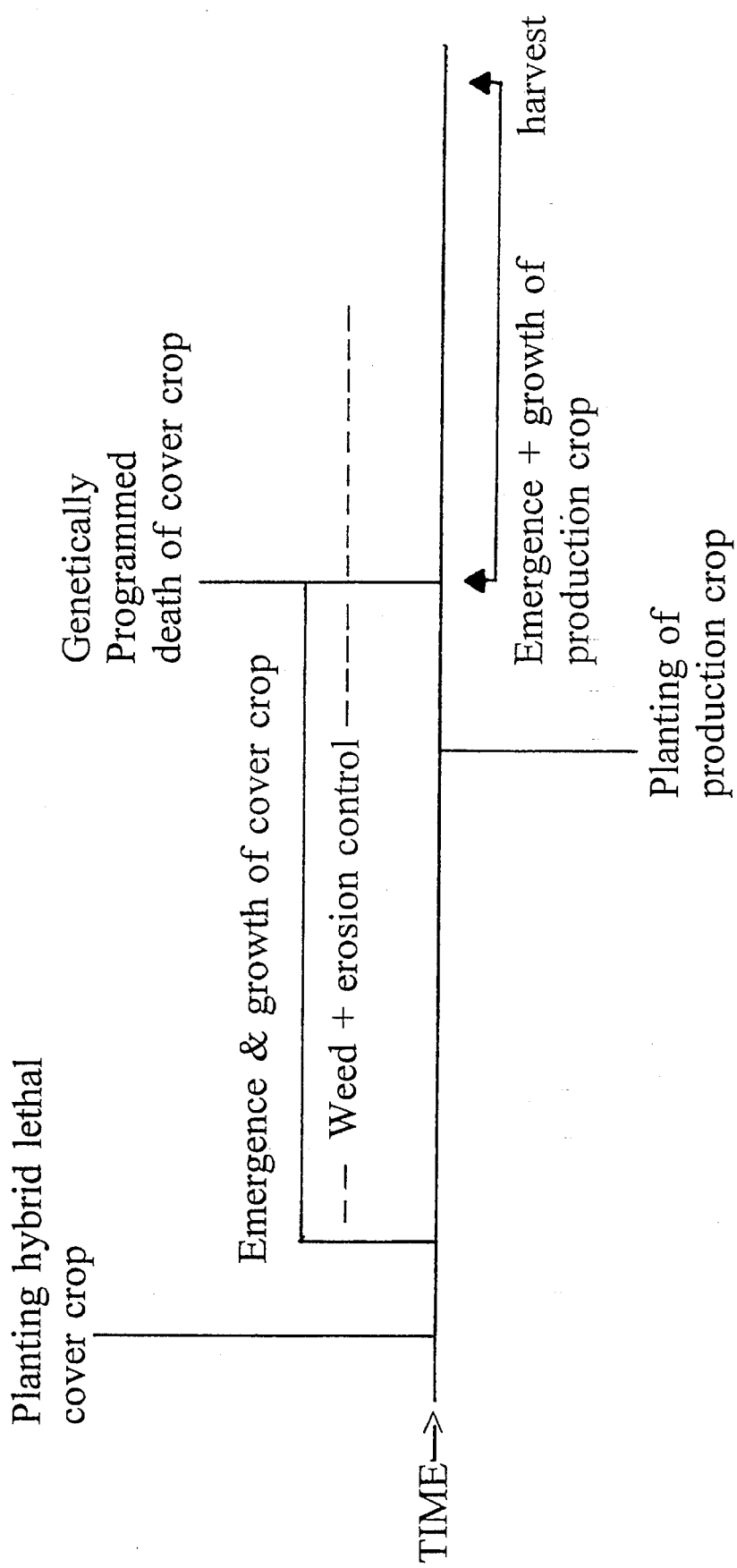
FIG. 1 is a schematic illustration of the use of a hybrid lethal cover crop to reduce soil erosion and weed growth before and during growth of an annual production crop.

Definitions of terms and explanations of abbreviations used herein are as follows:

CMS: Cytoplasmic Male Sterility—a plant genotype that is expressed as sterility in male plants. Sterile male plants produce no functional pollen, but the trait of male sterility is inherited only via the female parent. CMS plants are used extensively in the production of hybrid crop plants, such as corn. See generally, Suzuki et al. (1981) An Introduction to Genetic Analysis, 653, W. H. Freeman & Co.

Hybrid: A plant derived from any cross involving parents of different genotypes.

Hybrid lethal: See HN $F_1$ generation: (Also referred to as "$F_1$")—the first filial generation, produced by crossing two parental plants $F_2$ generation: (Also referred to as "$F_2$")—the second filial generation, produced by selfing or intercrossing the $F_1$ generation Filial generation: Successive generations of progeny in a controlled series of crosses, starting with two specific parent plants and selfing or intercrossing the progeny at each successive generation.

Backcrossing: Crossing an $F_1$ plant with one of its parental progenitors. Offspring plants of such a backcross are referred to as backcrossed or "BC" plants.

HN: Hybrid necrosis, also called hybrid lethality—a genetic condition of plants which produces a necrotic phenotype. The severity of the necrotic phenotype of a hybrid necrotic or hybrid lethal plant can vary from mild (few symptoms) to severe (premature death of the plant). HN is produced by combining, through breeding, two incompatible, dominant alleles in a single plant. These alleles are conventionally represented in varieties of winter wheat as $Ne_1$ and $Ne_2$. Hence, a hybrid necrotic, or hybrid lethal, winter wheat plant would have a genotype of $Ne_1 Ne_2$. The recessive form of these alleles which do not cause necrosis in winter wheat plants are represented genotypically as $ne_1$ and $ne_2$, respectively. It will be recognized that other hybrid lethal alleles may also be found in winter wheat and different hybrid lethal genotypes are found in other plant species and varieties. The use of the terms $Ne_1$, $Ne_2$, $ne_1$ and $ne_2$ is therefore simply used to illustrate one embodiment of the invention and is not a limitation on the types of hybrid lethal plants that can be used to practice the invention. Further explanation of the interaction of these particular alleles in hybrid lethal winter wheat is presented below.

SUMMARY OF THE INVENTION

The present invention provides cover crop systems which employ hybrid lethal plants. Hybrid lethal plants are genetically programmed to die prematurely. Therefore, use of a hybrid lethal plant as a cover crop eliminates or substantially reduces the need for the application of herbicides or mechanical tillage. The present invention thus greatly expands the utility of cover crops in weed and erosion control.

Although hybrid lethal plants, such as hybrid lethal wheat plants, have been previously described in the literature, (see generally Zeven (1965) Euphytica 14:239–243) conventional wisdom has been to avoid the possibility of introducing the hybrid lethal genotype into commercial wheat lines, since this is an undesirable trait when the aim is to maximize harvest yield.

The present invention recognizes, for the first time that the hybrid lethality trait can be beneficial in cover crops. Hence, a central aspect of the present invention is the production and use of cover crops that express a hybrid lethal phenotype. In one embodiment, the present invention provides methods of weed and erosion control in the growth of a production crop comprising planting a hybrid lethal plant before planting an annual production crop. The hybrid lethal plant subsequently dies at a time which does not substantially interfere with the growth of the production crop without requiring the application of an herbicide or mechanical removal. In order that the hybrid lethal cover crop plant not substantially interfere with growth of the production crop, it is preferred that cover crop dies at or before the time of emergence of the production crop. In preferred embodiments, the cover crop dies within two weeks before emergence of the production crop. In another preferred embodiment, the cover crop dies at the same time as the production crop emerges.

In one embodiment of this invention, the production crop is planted with a "no-till" planting device. This method of planting does not substantially disturb the cover crop. The cover crop thus continues to provide weed and erosion control until the emergence of the production crop. In this situation, the hybrid lethal cover crop dies at such a time that the cover crop does not substantially interfere with the growth of the production crop. Notably, the continued presence of the dead cover crop on the surface of the soil provides significant soil erosion and weed control even after emergence of the production crop.

A general schematic showing the use of cover crops as used in the context of the growth of an annual crop is shown in FIG. 1.

In an alternative embodiment of the present invention (herein referred to as the modified cover crop system) hybrid lethal plants are planted in a field as described above. However, rather than plant the annual production crop in the field without substantially disturbing the cover crop (using no-till planting), the production crop is planted with a conventional planting machine which substantially removes the cover crop in the rows in which the production seed is planted. Since the process of planting in this embodiment removes the cover crop from the rows of the production plant, it is not necessary that the timing of death of the cover crop coincides precisely with emergence of the production crop. The cover crop not removed by the planting procedure (e.g. between the planted rows) continues to provide weed and erosion control until it dies.

As described herein, the cover crop systems of the present invention may be used in the production of annual crops, such as, potatoes, and perennial crops, such as orchard, vineyard, or cane crops. In a perennial crop the necrotic hybrid cover crop would be reseeded each year.

Figure 2:
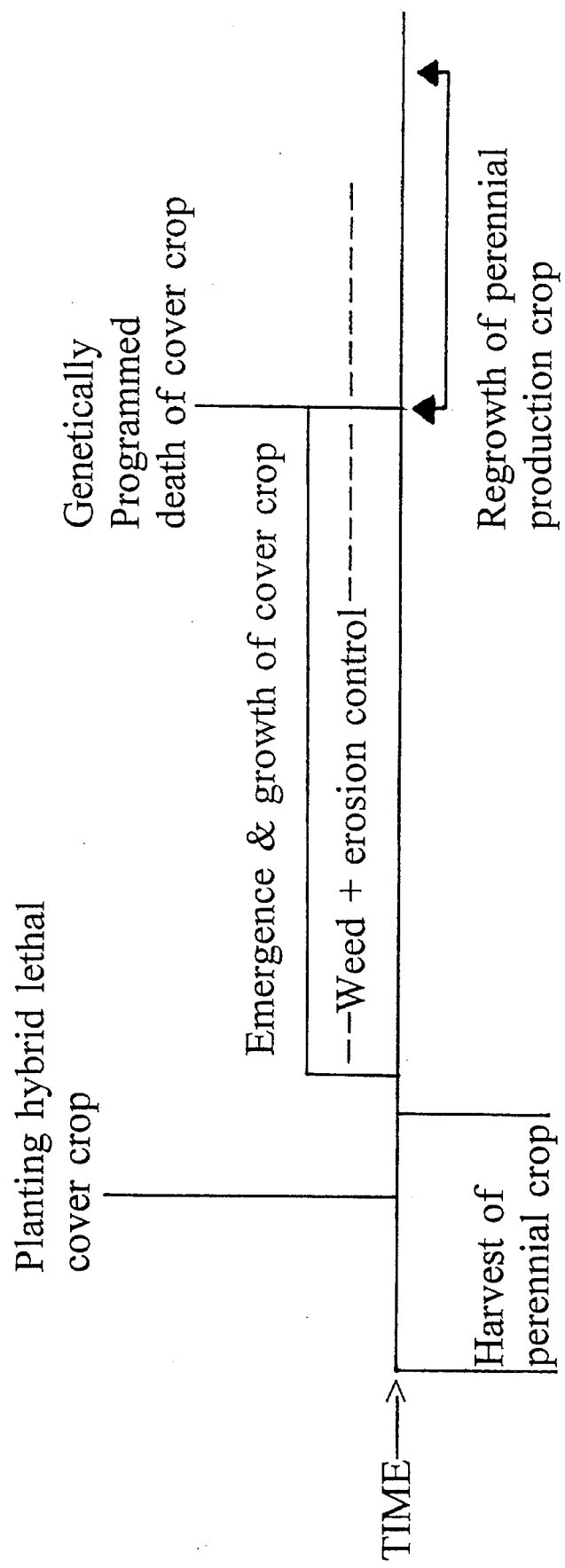
FIG. 2 is a schematic illustration of the use of a hybrid lethal cover crop to reduce soil erosion and weed growth before and during growth of a perennial production crop.

In an alternative embodiment, the cover crop system of the present invention can also be used with perennial production crops. This is illustrated schematically in FIG. 2. In this embodiment, the cover crop preferably dies after it substantially covers the soil surface.

An example of a hybrid lethal plant useful in the practice of the present invention is a wheat species, such as winter wheat. As described below, the use of hybrid lethal winter wheat as a cover crop provides excellent erosion and weed control in the production of an annual potato crop.

The present invention also provides hybrid lethal plants useful for the practice of the claimed cover crop systems. In particular, the present invention describes the production of cytoplasmic male sterile hybrid lethal winter wheat varieties. Preferably, such hybrid lethal winter wheat varieties are characterized by Sufficient winter hardiness to produce reliable spring stand, mild winter dormancy and early spring growth; high tillering capacity; and broad leaves. Such hybrid lethal winter wheat varieties are typically characterized by the genotype $Ne_1\ Ne_2$.

The extent to which the hybrid lethal cover crop plant grows before dying will affect the efficacy of soil erosion control and weed control that the cover crop produces. It will be apparent that any growth of a cover crop will reduce soil erosion and weed growth to some extent.

The growth of the hybrid lethal cover crop plant before death can be measured by determining dry weight biomass of the plant. The winter wheat varieties described herein preferably produce an average biomass of not less than 5 g per plant dry weight before dying, and more preferably not less than 10 g per plant. In a more preferred embodiment, the hybrid lethal winter wheat will produce an average biomass of at least 25 g per plant before dying, and in a still more preferred embodiment, the biomass before death will average at least 50 g per plant. However, it should be noted that the preferred biomass will be determined by many factors, including density of planting, timing of planting, nutrient and water availability etc. Furthermore, although the preferred biomass for hybrid lethal winter wheat are provided above, these figures will vary with other varieties of wheat and other hybrid lethal plant types. One skilled in the art will appreciate that a suitable hybrid lethal crop plant will be selected by consideration of factors including the identity of the production crop, the climate and soil conditions of the region and the type of cover crop being employed.

Also provided are hybrid lethal wheat varieties that die at or before emergence of a crop, produced by steps comprising:

crossing a cytoplasmic male sterile source to an Ne carrier, whereby the cytoplasmic male sterile source is used in this and all subsequent crosses as a female line, thereby synthesizing F1 seed;

crossing the F1 seed back to the Ne carrier one or more times, thereby producing BC seed;

crossing the BC seed and a pollinator line carrying an incompatible Ne allele, thereby producing hybrid lethal progeny; and selecting a hybrid lethal progeny that dies at or before emergence of the crop without the application of an herbicide.

These steps are also suitable for producing hybrid lethal cover crops of other plant species and varieties.

DETAILED DESCRIPTION OF THE INVENTION

The present invention provides cover crop systems employing plant varieties, such as hybrid lethal wheat varieties, having a genetic disorder that (1) results in sufficient vegetative growth to reduce soil erosion and to inhibit weed growth during the winter season of the cropping cycle of the production crop (potatoes, peanuts, soybeans, orchards, etc.); (2) does not permit normal reproductive growth of the cover crop; and (3) promotes a premature senescence and death in the cover crop such that acceptable growth may occur in the primary crop that has been protected by the cover crop.

Cover crops are not widely used at present; in instances where they are used, they are removed prior to planting by the application of herbicides. The hybrid lethal cover crops of the present invention can replace presently available cover crop lines and may be widely adopted in situations where cover crops are not currently used because their use is impractical or uneconomical.

There are three aspects of the hybrid lethal plants of the present invention that make them particularly useful as cover crops: (1) they can be produced as F1 hybrid seed; (2) there is vigorous early growth of the hybrid; and (3) there is appropriately timed senescence to minimize interference with the economic crop.

One example of such a hybrid lethal cover crop is hybrid lethal winter wheat. There are several potential advantages to a fall-planted winter wheat cover crop system for weed and erosion control in potatoes, for example. Winter wheat is well-adapted to the Pacific Northwest and is highly competitive with summer annual weeds. The major weeds infesting potatoes are summer annual species including kochia, wild oats, redroot pigweed, common lambsquarters, green foxtail, and hairy nightshade. Vigorous growth of a winter wheat crop disrupts the summer annual life cycle and could greatly reduce emergence and establishment of earlier germinating species such as kochia, wild oats (Avena spp.), and common lambsquarters (Ogg and Dawson (1984) Weed Sci. 32:327–335). Previous studies (Putnam et al. (1983) J. Chem. Ecology 9:1001–1010) also suggest that the killed-wheat mulch should suppress emergence and growth of later germinating species such as redroot pigweed, green foxtail, and hairy nightshade. Potatoes are highly competitive with weeds once row closure has occurred, and manipulating the cover crop to maximize weed control and minimize effects on potato growth should eliminate the need for preplant incorporated and preemergence herbicide applications.

Potatoes generally require three to four weeks from planting until emergence and fields are subject to severe wind erosion until a sufficient canopy has developed to protect the soil. Irrigated potatoes, especially those grown on rolling topographies, are also subject to water erosion from irrigation. A fall-planted cover crop would protect the soil from winter and spring wind erosion and from spring and summer water erosion. Finally, the cover crop could scavenge nitrogen not used by the previous crop and thus reduce nitrate leaching into ground water.

The Advantages of Hybrid Lethality

It has previously been necessary to either mechanically remove a cover crop or to apply an herbicide to kill the cover crop so that competition with the harvested crop will be reduced. The inventors have provided a method which eliminates the need for use of additional mechanical steps or application of chemical by developing a cover crop that has a life cycle long enough to provide weed control but short enough to reduce competition with the production crop. This has been accomplished by the taking advantage of hybrid necrosis.

Hybrid lethality, also called hybrid necrosis (HN), is a physiological disease of wheat caused by incompatible epistatic action of dominant alleles ($Ne_1$, $Ne_2$) at two loci. The genetic incompatibility is thus seen in F1 hybrids of parental lines each of which carries one of the dominant alleles. In minor conditions, yellowing of leaves, occurs; severe genotypes have a lethal reaction (Ausmus et al., Genetics and Inheritance, In: Wheat and Wheat Improvement, ed. Quisenberry and Reitz, ASA: Madison, Wis. (1967)). Hermsen (1963) described a series of alleles at both loci which produce necrotic reactions ranging from weak ($Ne^w$) to severe ($Ne^s$) (Euphytica 12:147–160). Genotypes of hybrid necrosis are (1) $Ne_1Ne_1ne_2ne_2$ ($Ne_1$-carrier), (2) $ne_1ne_1Ne_2Ne_2$ ($Ne_2$-carrier), and (3) $ne_1ne_1ne_2ne_2$ (non-carrier). A combination of $Ne_1$ and $Ne_2$ either in homozygous or heterozygous condition leads to hybrid necrosis, the degree of necrosis in the $F_1$ plants varying considerably due to multiple allelism of $Ne_1$ and $Ne_2$. Nine grades of necrosis have been distinguished, viz.:

grades 0 to 3: weak necrosis (normal seed produced)

grades 3 to 6: moderate necrosis (intermediate symptoms, premature seed)

grades 6 to 9: severe necrosis (no seed) These grades of necrosis are described in more detail in Table 5 below.

In describing the multiple alleles of $Ne_1$ and $Ne_2$, the symbols w, wm, m, ms, and s are used, with w=weak, m=moderate, and s=strong. Crosses between $Ne_1$ and $Ne_2$-carriers produce necrotic F1 progeny, but this is not the case when the parents carry the same gene or when a non-carrier is used as one of the parents.

The use of a necrotic hybrid wheat variety as a cover crop provides a number of advantages over fertile inbred wheat (i.e., normal wheat used in commercial production). The necrotic hybrid need not be chemically killed to reduce competition with potatoes, eliminating the cost and environmental insult of chemical application and providing weed control until potato canopy closure. Moreover, cover crops may be used in the production of low input or organic row crops where mechanical cover crop removal is impractical or ineffective. Because the necrotic wheat does not produce seed, it should not be counted against wheat acreage allotments for growers in Federal farm programs.

Hybrids may be synthesized by manual emasculation and cross-pollination, which is useful for production of small numbers of seeds for genetic studies. Alternatively, a chemical sterilant (gametocide) may be used to remove male fertility from one of the parents of the hybrid (designated the female parent). The sterilized lines will outcross to adjacent plots of the other parent (designated the male parent). Seed harvested from the female parent is a true F1 hybrid. The male parent produces self-pollinated seed which can be sold as grain, but not as seed. The preferred method of producing F1 hybrid seed is the use of cytoplasmic male sterility (CMS), which has been used to produce commercially available wheat hybrids for 20 years. Commercial production of the necrotic wheat hybrids is facilitated by backcrossing the female nuclear genes into a CMS cytoplasm. Normal hybrids using CMS require the transfer of fertility restorer genes into a restorer (R) line. However, as the necrotic hybrid is intended to senesce prior to anthesis, fertility restoration is unnecessary. In fact, sterility is desirable for necrotic hybrids to eliminate volunteer wheat in subsequent crops in the event of incomplete lethality.

Other characteristics which are desirable in a cover crop include:

(1) A growth habit conducive to weed suppression sufficient winter hardiness to produce reliable spring stand mild winter dormancy and early spring growth high tillering capacity broad leaves (2) Commercially viable seed production cultivars for cover crop are preferably adapted to local growing conditions if a hybrid is used, parents preferably have compatible rates of development to facilitate cross-pollination and a flower morphology which facilitates open pollination.

Genotypes of hybrid necrotic wheat varieties useful in the practice of the invention are described in the Examples below. Additional hybrid necrotic wheat varieties are provided in Hermesen (1962) Bastaard-necrose bij tarwe (*Hybrid necrosis* in wheat), Doctoral thesis, Wageningen, 129 pp, Verslagen van Landbouwk, Onderz. 68.5.; Hermsen (1963) Euphytica 12:1–16; Hermsen (1963) Euphytica 12:147–160; Zeven (1965) Euphytica 14:239–243; Zeven (1967) Euphytica 16:18–22; Zeven (1968) Euphytica 17:46–83; and Zeven (1969) Euphytica 18:43–57. A range of winter wheats carrying hybrid necrosis alleles are publicly available from the United States Department of Agriculture National Germplasm System. These include the wheat cultivars set forth in Table 1 below.

TABLE 1

| Cultivar | Plant Introduction No. (PI) or Wheat Cultivar Introduction No. (Cltr) | Carrier of | Allele* |
|---|---|---|---|
| Agent | Cltr 13523 | $Ne_1$ | m |
| Apulia Precoce | PI 157908 | $Ne_1$ | m |
| Blackhawk | Cltr 12218 | $Ne_2$ | s |
| Cappelle Desprez | PI 260897 | $Ne_2$ | ms |
| Cheyenne | Cltr 8885 | $Ne_2$ | ms |
| Cornell 595 | Cltr 12372 | $Ne_2$ | s |
| Ejuiea | PI 87117 | $Ne_1$ | m |
| Fulcaster | Cltr 11512 | $Ne_2$ | s |
| Golden Drop | Cltr 6316 | $Ne_1$ | w |
| Heines VII | PI 285953 | $Ne_2$ | m |
| Maris Widgeon | Cltr 14455 | $Ne_2$ | ms |
| Montana No. 36 | Cltr 5549 | $Ne_2$ | s |
| Nord Desprez | PI 167419 | $Ne_2$ | ms |
| Ponca | Cltr 12128 | $Ne_1$ | s |
| Triplet | Cltr 5408 | $Ne_2$ | ms |
| Wasatch | Cltr 11925 | $Ne_2$ | s |
| Yayla 305 | PI 178776 and PI 341272 | $Ne_1$ | m |

*Allelic notation after Hermson, (1963) Euphytica 2:147–160.
w-weak, m-moderate, ms-moderately severe, s-severe necrotic reaction It will be readily appreciated by those of skill in the art that although the Examples below describe the use of hybrid necrotic winter wheat as a cover crop for potatoes, this principle may be more broadly applied to the use of cover crop systems employing a hybrid lethal factor or similar lethal phenotype for use in the control of weeds, soil erosion, water loss, or other deterioration of soil or crop quality due to exposed soil surfaces in crops such as sugarbeets, squash, onion, peanuts, sweet corn, soybeans, and asparagus, among others.

Hybrid lethal cover crops are also useful for weed suppression and erosion control with perennial crops, including, but not limited to, orchards, vineyards, and cane crops (raspberry, blackberry, etc.). A typical cover crop system would include a fall planting of the cover crop with normal growth and a necrotic response in the spring. Currently, weed control in perennial crops includes cultivation or planting of an annual cover crop that is ploughed under or mechanically removed. If the cover crop is ploughed under, the soil is exposed to erosion. If the cover crop is mechanically removed, an additional field operation is required. The use of a hybrid lethal cover crop would avoid both problems, eliminating the need for ploughing or mechanical removal of the cover crop.

In general, the lethal phenotype characterizing cover crops provided by this invention is an incompatibility in the hybrid or non-inbred plant that does not interfere with embryo or seedling development but is expressed later in plant ontogeny.

The Examples provided below relate specifically to the use of hybrid lethal winter wheat as a cover crop. However, the hybrid necrosis genetic system is well-known in species related to winter wheat: durum and other tetraploid wheats, including, but not limited to, *Triticum turgidum* var. durum, *Triticum dicoccum*, and *Triticum timopheevi* (Tsunewaki, (1992) Genome 35:594–601; Zeven (1981) Euphytica 30:521–539), and diploid wheats, including *Triticum monococcum*, Aegilops spp., Etymus, and Agropyron (Chen et al. (1990) Genome 33:663–667). The hybrid necrosis genetic system is also well-known in related cereals, including, but not limited to, triticale, X. tritosecale, and rye, Secale spp. (Ren and Lelley (1988) Plant Breeding 100:173–180; Ren and Lelley (1990) Genome 33:40–43). A hybrid necrosis system has also been reported in tomatoes (*Lycopersicon esculentum*, Agadzhanyan (1991) Sov. Genetics 26:955–960). The hybrid chlorosis system in wheat (Tsunewaki (1992) Genome 35:594–601) may also be exploited to provide suitable cover crops for the practice of the present invention. A semi-lethal trait in maize called hybrid chlorosis has also been reported (Yudin and Lukin (1991) Sov. Genetics 27:305–311). It will therefore be apparent to one of ordinary skill in the art that the present invention is not limited to the use of hybrid lethal winter wheat as a cover crop, but that hybrid lethal varieties of other plants may also be exploited for use as cover crops.

The invention will be better understood by reference to the following examples, which are intended to merely illustrate the best mode now known for practicing the invention. The scope of the invention is not to be considered limited thereto.

EXAMPLES

Example 1

Effects of Winter Wheat Cover Crops on Weed Control and Potato Growth

Experimental design 1: Chemically killed winter wheat.

In order to test the potential efficacy of hybrid lethal winter wheat as a cover crop, an experiment was performed using normal wheat which was chemically killed at various times relative to the emergence of the production crop to mimic different manifestations of the hybrid lethal phenotype. The experimental system was designed using potatoes as the production crop and with fall planted 'Weston' winter wheat as the cover crop; the chemical treatment used to kill the wheat was applied relative to the time of emergence of the potato crop. The wheat cover crop was chemically killed two weeks before potato emergence (2 WBE), one week before potato emergence (1 WBE), or at emergence (AT EM) in order to determine the optimum time to kill wheat for maximum weed control and minimum effect on potato growth.

Both weedy and weed free treatments were included in order to separate the effects of weeds and wheat cover crop on the growth and yield of potatoes. These experiments were conducted at the University of Idaho Aberdeen Research and Extension Center, Aberdeen, Id.

For the chemically killed winter wheat cover crop system the experimental design was a factorial arrangement of a randomized complete block with four replications. Factors studied included level of weed infestation (weedy vs. weed free) and cover crop treatments. Cover crops included: (1) no winter wheat cover crop; (2) winter wheat killed 2 WBE; (3) winter wheat killed 1 WBE; and (4) winter wheat killed AT EM.

Winter wheat was fall-seeded in rows spaced 9 inches apart at 60 lbs/acre into beds prepared for potato production. Potatoes were no-till seeded directly into the winter wheat the following spring. Glyphosate (Monsanto, St. Louis, Mo.), applied with a selective applicator, was used to kill the wheat. Individual plot size was 12 feet by 70 feet (4 potato rows spaced 36 inches apart).

The experimental area was naturally infested with hairy nightshade, kochia, redroot pigweed, common lambsquarters, and green foxtail, common weeds in potato fields in the Pacific Northwest. Weed biomass by species was measured in two $0.25\text{-m}^2$ quadrats/plot throughout the growing season. Weed population counts also were made throughout the growing season. Time of weed emergence by species was noted for all treatments.

Wheat biomass was measured at each kill date and every two to three weeks throughout the growing season. The date of Feekes stages 10, 20, 30, and 40 (if reached) was also noted for winter wheat (see Nelson et al., Growth Staging of Wheat, Barley, and Wild Oat, Montana State Experimental Station Bulletin, 1988). Winter wheat residue was evaluated every two to three weeks throughout the growing season using Soil Conservation Service standards (Anonymous, Picture Your Residue, USDA Soil Conservation Service, SCS-CRM-02, April 1992). The influence of winter wheat interference on potato growth and yield was determined by measuring potato leaf area and biomass accumulation throughout the growing season and potato tuber yield and quality at final harvest in October.

Potato/wheat crops were also monitored for changes in insect populations. Insect populations in weedy and weed-free cover crop and no cover crop plots were monitored throughout the growing season by systematic insect sweeps and plant tissue collection at two to three week intervals. Insect populations on plant tissue were collected with a Berlese funnel. Populations in cover crop and no cover crop plots were compared for changes in numbers of beneficial and damaging insects.

Experimental design 2: Modified winter wheat cover crop system.

A modified winter wheat cover crop system for potatoes was also examined. In this system, wheat over the potato rows was mechanically killed by the planting operation (i.e., potatoes were planted with a standard planter rather than being no till planted). A selective herbicide was then banded over the potato rows; wheat between the rows was killed with glyphosate just before potato emergence.

TABLE 2

Results from experimental design 1
Weed biomass production (lb dry wt/Acre) in
three winter wheat cover crop treatments and a
weedy no cover crop control, Aberdeen, ID.

| Treatment | 1992 | | | 1993 | | |
|---|---|---|---|---|---|---|
| | 6/10 | 7/9 | 9/2 | 6/8 | 7/6 | 8/30 |
| No cover crop weedy control | 3512 | 8033 | 20063 | 1226 | 5724 | 9301 |
| Wheat killed 2 WBE | — | — | — | 115 | 2708 | 7950 |
| Wheat killed 1 WBE | 7 | 104 | 7064 | 98 | 833 | 5918 |
| Wheat killed AT EM | 18 | 17 | 600 | 100 | 7 | 527 |

TABLE 3

Results from experimental design 1
U.S. #1 and total tuber yield (CWT/Acre) of
potatoes grown in a weed-free no till winter
wheat cover crop system or in a weed-free no
cover crop control, Aberdeen, ID.

| | 1993 Potato Tuber Yield | |
|---|---|---|
| Treatment | U.S. #1 | Total |
| No cover crop weed-free control | 197 | 420 |
| Wheat killed 2 WBE | 189 | 419 |
| Wheat killed 1 WBE | 169 | 376 |
| Wheat killed AT EM | 136 | 251 |
| L.S.D. 0.05 | 36 | 53 |

TABLE 4

Results from experimental design 2
U.S. #1 and total tuber yield (cwt/Acre) of
potatoes grown in a modified winter wheat
cover crop system or in a weed-free no cover
crop control, Aberdeen, ID.

| | 1993 Potato Tuber Yield | |
|---|---|---|
| Treatment | U.S. #1 | Total |
| No cover crop weed-free control | 186 | 353 |
| Modified cover crop control | 194 | 308 |
| L.S.D. 0.05 | 33 | 54 |

Results of Experiment Designs 1 and 2:

As shown in Tables 2–4 above, the winter wheat crop provided substantial weed control in potatoes. The degree of weed control varied with the wheat kill date. Killing the wheat 2 WBE gave acceptable weed control through June; killing the wheat 1 WBE gave acceptable control through July; and killing the wheat AT EM gave excellent weed control throughout the season (Table 2).

To maintain acceptable weed control throughout the season in the 2 WBE and 1 WBE treatments, weed control provided by the wheat cover crop system may be supplemented with a reduced rate postemergence application of metribuzin. When the 2 WBE and 1 WBE treatments were maintained weed free throughout the season, U.S. #1 (marketable tuber) yields were not significantly different than the no cover weed free control (Table 3).

Although weed control was excellent with the treatment AT EM, U.S. #1 potato yields were reduced 31% compared to the no cover crop weed free control. Yield loss occurred in part because the thick wheat mulch shaded the soil and the shaded soil was cooler, which resulted in delayed potato emergence. The thick mulch also reduced light interception by newly emerged potatoes, which delayed their development. In the modified winter wheat cover crop system, where wheat directly over the potato row was mechanically killed by the planting operation and wheat between the rows was killed just before potato emergence, overall weed suppression was very good. The wheat between the rows provided good weed control and the herbicide banded over the row gave excellent in-row weed control. Because the wheat over the potato rows was destroyed during planting, problems with soil temperature and light interception encountered with the no till AT EM treatment were eliminated. As a result, tuber yields in the modified winter wheat cover crop system were equal to yields in the no cover crop weed free control (Table 4). The modified winter wheat cover crop system has the advantage of being immediately useful to growers, since there would be no need to purchase a no till planter (growers currently use a standard planter, which greatly disturbs the cover crop growing over the row).

Insect populations in the cover crop and no cover crop plots were also monitored throughout the growing season at Aberdeen. Pest species such as the Colorado potato beetle and green peach aphid were similar in cover crop and no cover crop plots.

In addition to providing weed control, the winter wheat cover crop system also provided excellent erosion control. Residue from the 1 WBE treatment provided an average of 65% soil cover during the 1992 growing season and 40% cover during the 1993 season, as estimated by the SCS line transect system. Residue from the treatment AT EM provided an average of 73% soil cover during the 1992 growing season and 70% cover during the 1993 season.

Experimental Design 3: Hybrid Necrotic Winter Wheat.

The usefulness of different severity levels of necrotic response was examined. Hybrids exhibiting a range of necrotic responses from moderate (e g., $Ne_1^w ne_1$, $Ne_2^{ms} ne_2$) to severe ($Ne_1^s ne_1$, $Ne_2^s ne_2$) were formed using hand pollination. Combinations of parents followed hybrid combinations demonstrated to produce a necrotic reaction by Hermsen (1963) Euphytica 12: 147–160, and Zeven (1965) Euphytica 14:239–243, (1967) Euphytica 16:18–22, (1968) Euphytica 17:46–83, and (1969) Euphytica 18:43–5. The crossing design involved a cross classified design between the $Ne_1$ carriers and $Ne_2$ carriers listed in Table 5, below. Hybrids were evaluated in the field for timing of onset of necrosis, severity of necrosis, and seed set. Parents of hybrids were also evaluated for factors important in commercial production of hybrid lethal seed: timing of flowering, extent of anther extrusion, winter survival, and tillering. The information obtained from this research was used to make improved second generation necrotic hybrids with optimized interactions with the potato crop and its weeds.

TABLE 5

Results from experiment design 3
Hybrid Necrosis Reactions of Hybrids Grown in
the Field at Aberdeen, ID, 1993

| Parent carrying Ne1 | Parent carrying Ne2 | Necrosis Date. | Necrosis reaction at 6/16 | Plant height (cm) | 12 Jun dry wt (g/plant) | 1 Sep dry wt (g/plant) |
|---|---|---|---|---|---|---|
| Ponca | Blackhawk | 22 Apr | 9 | 2 | 3 | SAE |
| Ponca | Cornell 595 | 22 Apr | 9 | 2 | 8 | SAE |
| Ponca | Heines VII | 22 Apr | 8 | 10 | 8 | SAE |
| Ponca | Nord Despres | 22 Apr | 9 | 16 | 55 | SAE |
| Ponca | Triplet | 22 Apr | 9 | 2 | 3 | SAE |
| Ponca | Wasatch | 22 Apr | 9 | 2 | 2 | SAE |
| Ponca | Widgeon | 22 Apr | 8 | 2 | 3 | SAE |
| Yayla 305 | Wasatch | 22 Apr | 7 | 14 | 24 | 23 |
| Ejuiea | Widgeon | 7 May | 3 | 20 | 53 | ND |
| Ponca | Capelle Despres | 7 May | 9 | 2 | 1 | SAE |
| Yayla 305 | Nord Despres | 7 May | 7 | 15 | 64 | 34 |
| Yayla 305 | Triplet | 7 May | 7 | 15 | 31 | 57 |
| Yayla 305 | Widgeon | 7 May | 7 | 19 | 69 | 49 |
| Agent | Wasatch | 23 May | 7 | 18 | 88 | 46 |
| Ejuiea | Wasatch | 23 May | 6 | 15 | 87 | 110 |
| Yayla 305 | Heines VIII | 23 May | 5 | 19 | 62 | 194 |
| Agent | Triplet | 27 May | 5 | 20 | 83 | 145 |
| Agent | Widgeon | 8 Jun | 4 | 20 | 261 | 208 |
| Yayla 305 | Montana 36 | 16 Jun | 1 | 18 | 139 | 172 |
| Agent | Capelle Despres | 16 Jun | 2 | 19 | ND | 627 |
| Ejuiea | Capelle Despres | 16 Jun | 1 | 19 | 247 | 317 |
| Ejuiea | Nord Despres | 16 Jun | 4 | 19 | 136 | 159 |

SAE: same as early sampling, plants had stopped growing.
ND: no data available
Necrosis date: Date necrotic lesions were noted to have extensive necrosis (necrosis rating 3 or greater) or date of peak necrosis rating if necrosis never spread to upper leaves.
Necrosis reaction: Scale of 0–9, where: 0 - no necrosis; 1–2 - minor necrosis on lower leaves; 3 - all leaves below 1 or 2 penultimate leaf necrotic; 4–8 - increasing levels of necrosis on culm and penultimate leaves; 9 - plants dead.

Results of Experimental Design 3:

Hybrid necrotic wheat lines were studied from 1992 to 1993. Replicated plots of one to eight plants were planted in early September 1992 and monitored for the onset of necrosis. Included in the field were the parents of the hybrids. The hybrids were compared to the parents to confirm that they were true hybrids rather than the result of accidental self-pollination. Plots were visually inspected for necrosis on a regular basis from mid-April to mid-June. Half of the plot was harvested in June 1993, when the heads of most of the parents had emerged from the flag leaf, and the other half in September 1993, at plant maturity. The most severe hybrids senesced early, before producing a significant amount of biomass. These would be less suitable as a cover crop because their poor growth would provide less protection against soil erosion and less weed control. Genotypes with the optimum combination of necrosis and biomass production were lines that reached extended necrosis during the month of May. These typically were hybrid combinations in which one parent carried a severe necrotic allele ($Ne_1^s$ or $Ne_2^s$) and the other parent carried a moderate necrotic allele ($Ne_1^m$ or $Ne_2^m$). Hence, genotypes producing optimum combinations of necrosis and biomass production include, but are not limited to: $Ne_1^m Ne_2^s$ and $Ne_1^s Ne_2^m$. Preferably, the senescence of such optimal hybrids is in the same range of cover crop plant death as the kill dates in the cover crop experiments: 1 WBE or AT EM.

Wheat which dies AT EM or shortly thereafter work very well in the claimed cover cropping systems, e.g., in a modified winter wheat cover crop system. For example, most crosses to 'Ponca' die well before emergence (approximately 2–3 weeks pre-emergence). Desirable hybrids would for example be combinations of $Ne_2$ carriers with Ponca that produce a moderate amount of biomass prior to senescence (e.g., Ponca/Nord Despre). Preferably, the hybrid lethal winter wheat varieties described herein produce an average biomass of not less than 5 g per plant dry weight before dying, and more preferably not less than 10 g per plant, and more preferably still, not less than 25 g per plant. In a more preferred embodiment, the hybrid lethal winter wheat will produce an average biomass of at least 50 g per plant before dying. The optimum biomass production will be dependent on several factors, including planting density of the cover crop, timing of senescence, sensitivity of the production crop to competition, nutrient factors and climatic conditions.

Utilization of a necrotic winter wheat hybrid in either the no till or the modified winter wheat cover crop system eliminates the need for a glyphosate application to kill the wheat.

To lower production costs and make the necrotic hybrid technology broadly available, the nuclear genes of Ne carrier lines ("recurrent parent"), e.g., 'Ponca' and 'Wasatch', are backcrossed into a, cytoplasmic male sterile genotype. Thus, for example, the recurrent parent would be crossed into the *T. timopheevi* Zhukov cytoplasm using as a donor parent a *T. aestivum* genotype with *T. timopheevi* cytoplasm. The *T. timopheevi* cytoplasm has been shown to have an incompatibility with normal *T. aestivum* nuclear genomes, producing a male-sterile response but no other significant maladies (Wilson and Ross (1962) Wheat Info. Serv. 14:29–31). Backcrosses have been made to the recurrent parent. The breeding strategy is presented in Example 2.

EXAMPLE 2

Breeding Program to Develop Necrotic Hybrid Wheat for Cover Crops

Year 1: Greenhouse Crossing

Synthesize an F1 seed: Cross CMS source to an Ne carrier using the CMS source as a female line. In all subsequent crosses the CMS carrying source will be used as a female.

Synthesize BC1 seed: Grow $F_1$ seed and cross back to the Ne carrier ("recurrent parent") to form Back Cross 1 (BC1) seed.

Year 2: Greenhouse Crossing

Synthesize BC2 seed: Grow BC1 seed and cross back to recurrent parent to from BC2 seed.

Synthesize BC3 seed: Grow BC2 seed and cross back to recurrent parent to form BC3 seed.

Year 3: Greenhouse Crossing

Synthesize BC4 seed: Grow BC3 seed and cross back to recurrent parent.

Synthesize 'A' line seed: Grow BC4 seed and cross back to recurrent parent. Seed from this cross will hereinafter be referred to as A line seed. The recurrent parent will hereinafter be referred to as the 'B' line. This nomenclature is consistent with the hybrid maize and hybrid wheat literature.

Synthesize necrotic hybrids (simultaneous with synthesis of A line seed): A small number of hybrid seeds are synthesized between the BC4, CMS line and a pollinator line carrying an incompatible Ne gene (producing a necrotic plant when crossed into a hybrid). Pollinator lines carrying incompatible Ne alleles will hereinafter be referred to as 'C' lines. In standard hybrid seed literature these lines would be referred to a 'R' lines because they carry genes that would restore male fertility to the A line. In a hybrid necrosis cover crop restorer genes are unnecessary because the hybrids should senesce prior to seed production.

Year 4: Field Testing and CMS seed Increase

Small scale testing of hybrids: A/C hybrids from Year 3 greenhouse are planted in the field and evaluated for potential as a necrotic hybrid.

Seed increase Of CMS line: A line seed from the greenhouse is planted in an isolated field surrounded by a planting B line. Open pollination occurs from the B line to the A line. The seed harvested from A line plants is male sterile and is referred to as A line seed.

Year 5: Synthesis of A/C Hybrids for Large Scale Testing and Seed Increase of the A Line Hybrid seed synthesis: Crosses that appear promising in Year 4 are synthesized using isolated field crossing blocks. A lines from Year 4 seed increases are planted in isolation with C pollinator lines.

Seed increase of CMS line: The Year 4 seed increase of the A line is repeated.

Year 6: Field Testing

Replicated large plot field testing of A/C necrotic hybrids: Field plots of hybrids are planted in replicated trials at multiple locations and evaluated for efficacy as a cover crop.

Hybrid seed synthesis: Repeat Year 5 hybrid synthesis.

Seed increase of CMS line: The Year 4 seed increase of the A line is repeated.

Years 7 and 8: Repeat Year 6 Field Program Eliminating Undesirable Hybrids

Year 9: Synthesize 1 to 2 Hybrids on a Large Scale for Release

All publications cited in this specification are incorporated herein by reference to the same extent as if each individual publication was specifically and individually indicated to be incorporated by reference.

This invention has been described in detail both by example and by description. One of ordinary skill in the art will be able to surmise equivalents to the invention as described in the claims which follow but which would be within the spirit of the description above. Those equivalents are to be included within the scope of this invention.

What is claimed is:

1. A method of weed and erosion control in the production of a crop plant comprising planting a hybrid lethal plant, wherein the hybrid lethal plant dies without chemical application at a time which does not substantially interfere with the production of the crop plant.

2. A method according to claim 1 wherein the hybrid lethal plant dies before or at about the same time as emergence of the crop plant.

3. The method of claim 2 wherein the hybrid lethal plant dies within two weeks before emergence of the crop plant.

4. A method according to claim 1 wherein the crop plant is an annual crop plant.

5. A method according to claim 4 wherein the crop plant is potato.

6. A method according to claim 1 wherein the crop plant is a perennial crop plant.

7. A method according to claim 6 wherein the crop plant is an orchard, vineyard, or cane crop plant.

8. The method of claim 1 wherein the hybrid lethal plant is a wheat species.

9. The method of claim 8 wherein the wheat species is a hybrid lethal winter wheat species.

10. The method of claim 9 wherein the hybrid lethal winter wheat plant produces at least an average of 5 g dry weight biomass before dying.

11. The method of claim 10 wherein the hybrid lethal winter wheat plant produces at least an average of 10 g dry weight biomass before dying.

12. The method of claim 9 wherein the hybrid lethal wheat species is of genotype $Ne_1$ $Ne_2$.

13. The method of claim 12 wherein the hybrid lethal wheat species has a genotype selected from the group consisting of: $Ne_1^m$ $Ne_2^s$ and $Ne_1^s$ $Ne_2^m$.

14. A method of reducing weed growth and soil erosion in the production of a crop plant comprising:

providing a seed or seedling of a hybrid lethal plant;

planting the seed or seedling of the hybrid lethal plant in a field;

providing a seed or seedling of a crop plant; and planting the seed or seedling of the crop plant in the field, and wherein the hybrid lethal plant dies without chemical application at a time which does not substantially interfere with the growth of the crop plant.

15. The method of claim 14 wherein the hybrid lethal plant seed or seedling is planted at least 2 months prior to the planting of the crop plant seed or seedling.

16. The method of claim 14 wherein the crop plant seed or seedling is planted without substantially removing the hybrid lethal plant from the field.

17. The method of claim 16 wherein the crop plant seed or seedling is planted with a planting device which substantially removes the hybrid lethal plant from the field.

18. The method of claim 14 wherein the hybrid lethal plant dies before or at about the same time as emergence of the crop plant.

19. A method of reducing weed growth and soil erosion in the production of a potato crop, comprising planting a hybrid lethal winter wheat variety of genotype $Ne_1$ $Ne_2$ in a field in the fall season and planting seed potatoes in the field in the spring season and wherein the hybrid lethal winter wheat variety dies prematurely without chemical application at a time such that the hybrid lethal winter wheat does not substantially interfere with the growth of the potato crop.

20. A method of controlling weed growth and soil erosion in a farming operation, the method comprising planting a field with a hybrid lethal wheat plant, wherein the hybrid lethal wheat plant dies before reaching maturity and without application of a herbicide.

* * * * *